UNITED STATES PATENT OFFICE.

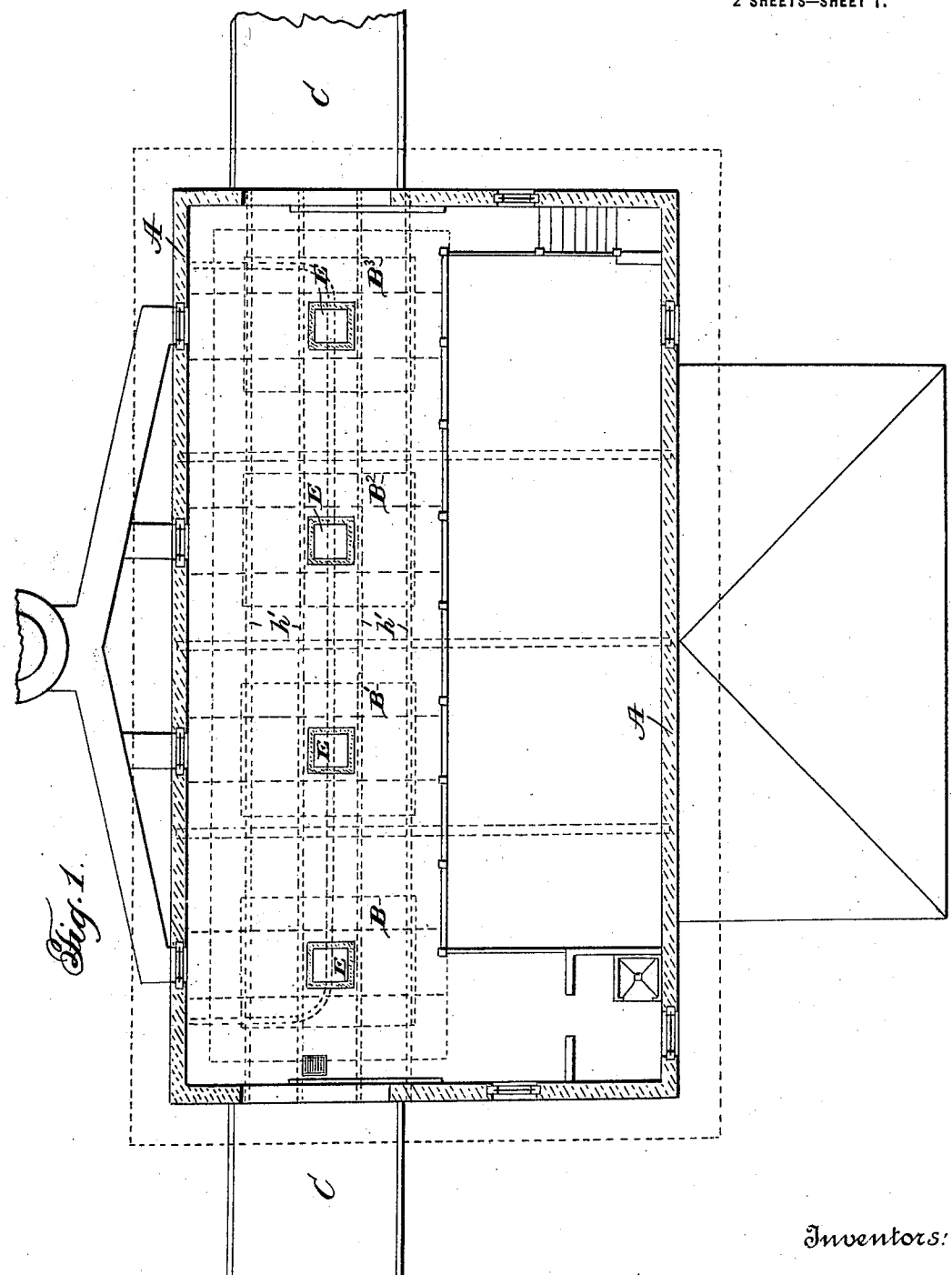

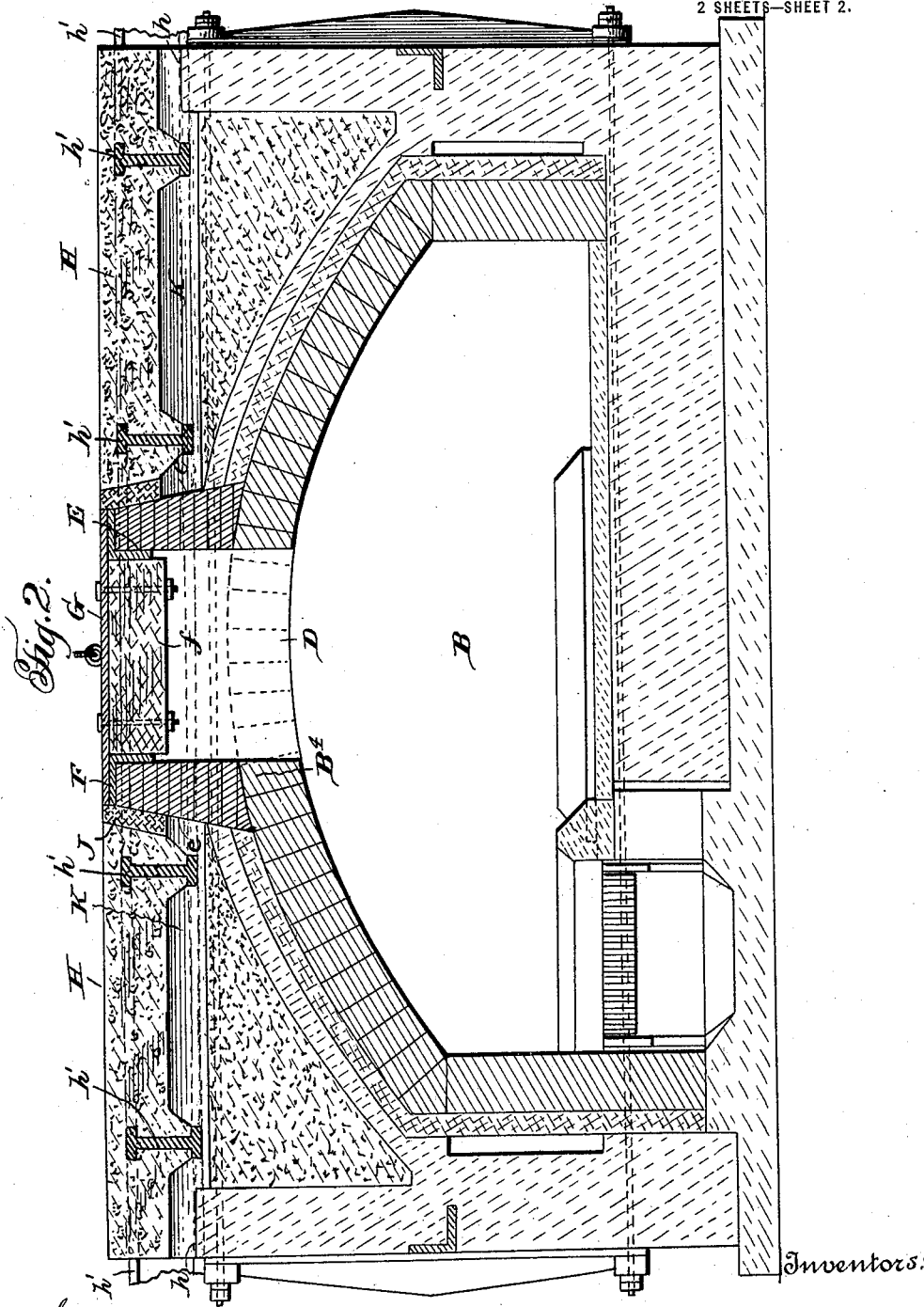

WILLIAM FETZER AND JOHN G. FRERES, OF SPRINGFIELD, AND OTTO A. ELLIOTT, OF MARION, ILLINOIS, ASSIGNORS TO INTERNATIONAL SANITATION & DEVELOPMENT COMPANY, OF SPRINGFIELD, ILLINOIS, A COPARTNERSHP CONSISTING OF SAID FETZER, FRERES, AND ELLIOTT.

INCINERATING-FURNACE.

1,398,184. Specification of Letters Patent. Patented Nov. 22, 1921.

Application filed September 18, 1917. Serial No. 192,016.

*To all whom it may concern:*

Be it known that we, WILLIAM FETZER, JOHN G. FRERES, and OTTO A. ELLIOTT, citizens of the United States, residing at Springfield, Marion, and Springfield, respectively, in the counties of Sangamon, Williamson, and Sangamon respectively, and State of Illinois, have invented certain new and useful Improvements in Incinerating-Furnaces, of which the following is a specification, reference being had therein to the accompanying drawing.

This invention relates to an improvement in incinerating furnaces, and more especially to what is known as garbage incinerators, such as are employed for incinerating or destroying garbage at central plants.

Heretofore these furnaces or incinerators have been located adjacent to towns or villages, and the garbage collected has been transported to the incinerators and dumped into the furnaces. In the companion application, filed September 18, 1917, Serial No. 192,015, for patent we have described the furnace in detail, and the present invention is directed more specifically to a structure embodying one or a plurality of furnaces with a driving floor properly positioned in combination with the furnace so that in driving over the floor the expensive refractory furnace parts will not be disturbed while at the same time the position of the floor with relation to the furnace is substantially in close proximity, as though the floor were a part of the top of the furnace. These driving floors have heretofore been either positioned at a considerable distance above the furnace or have been connected and united with the furnace walls, both of which have their objections as those skilled in the art will appreciate.

The present invention has for its object the positioning of the driving floor with relation to a unit or a battery of furnaces so that the floor will be kept in its proper position and undue expansion by the heat prevented, while the furnace throat may be located in the floor and made of short vertical height so that the material deposited in the furnace will enter directly thereinto while the floor and the throat parts are as unitary structure incapable of transmitting to each other any objectionable vibrations or heat.

In the accompanying drawings, an embodiment of the invention is shown with the understanding, however, that various changes and alterations can be made without departing from the general principles depicted in the structure and residing in the invention disclosed.

Figure 1 of the drawings is a partial top plan and horizontal section of an incinerating plant composed of four units or sections, the reinforcing eye beams for the driving floor being indicated by dotted lines.

Fig. 2 is a section through one of the furnaces.

A represents the wall of the building, and B, B', $B^2$ and $B^3$ represent respectively the furnaces.

C designates the driveways leading to above the furnaces. The furnace comprises suitable arch and side walls of any approved construction having their respective sides and tops formed independently, that is, one furnace is wholly independent of the other. This may, however, be altered as desired. The top of the furnace $B^4$ (in this connection we will describe a single furnace) has a feed opening D, located conveniently centrally and this opening is provided with a receiving throat E extending above the top of the arch and well above the furnace top. This throat is formed with vertical inner walls and tapered or inclined outer walls as at e, the base of the taper merging into the top of the furnace. Set into the top of the throat is a flanged metal collar F, the inner wall of which is conveniently flush with the inner wall of the throat. G represents the cover member having its depending part insulated by suitable brick work f, its upper part being conveniently of metal and of a size to override the top of the throat of the feed opening, the edge of the cover terminating at the outer edge of the collar F. H represents the driving floor. This is composed conveniently of concrete reinforced in any suitable manner and is supported entirely by the walls of the building as at h and is reinforced by I beams h' which extend longitudinally of the building immediately over the tops of the various furnaces, finding anchorage in the walls of the building. These I beams may be of any convenient number, but it has been found exceedingly helpful if there is an I beam $h'$ located adjacent the throats E on opposite sides as shown in Fig. 2. The spacing apart of these I beams is substantially that of the average wagon gage. The floor at the point where the I beams are placed is extended slightly downward as shown in Fig. 2, thus representing trusses for the structure. The floor part is spaced a short distance from the throat and interposed between the throat and the floor or the concrete is a packing material of a yielding nature, as indicated at J. This material serves as an insulator, and also prevents vibrations of the floor during the passage of the horses and carts thereover from being transmitted to the throat. It has been found expedient to elevate the floor only slightly above the furnace and holding it independently of the furnace. This enables the use of a short throat and relieves the furnace structure of all extraneous weights and vibrations which would be transmitted thereto were the floor supported in any particular by the furnace walls. It is necessary, however, with a view of conserving the heat, to form a small space between the floor and the top of the furnace, but this distance should be as narrow as possible so that the whole battery will be compact, and the height above the furnace at the point of discharging the carts into the furnace as low as possible. The space K between the furnace top and the floor represents what may be characterized as a shallow air space. This is conveniently open at the front so that there may be sufficient circulation to prevent the radiated heat from expanding the floor materially or injuriously while the connections with the throat which passes through the floor are such that all vibrations are absorbed before they are transmitted to the throat or the arch of the furnace. In fact, it may be asserted that the throat of the furnace is relieved of vibrations and shocks through the loose connection or association with the floor, while the reinforcement of steel collar for the throat prevents the breaking down of the fire brick lining thereof during the act of dumping the material in the furnace. The structure, as a whole is compact and as the carts are driven up one incline over the furnace opening where the contents are discharged they proceed across the battery of furnaces and down the opposite incline from the building. As many carts ordinarily are employed, and are driven over the top of the furnaces, it is essential that a firm floor be employed and that the damage of the furnace itself or its arch be prevented.

It is to be understood that different forms of section of throat wall may be employed, but the inclined type of form is preferred, especially when used in connection with the yieldable packing.

Having thus described the invention, what is claimed as new and desired to be secured by Letters Patent is:

1. In an incinerating plant, the combination with walls and a furnace, of a throat member extending upwardly from the furnace and carried thereby, a driving floor located adjacent the top of the furnace and through which the throat member loosely passes, and a packing interposed between the throat and the driving floor.

2. In an incinerating plant, a furnace having an upwardly extending throat with sloping outer walls, and a composite floor into which the throat extends and a yielding packing between the floor and throat.

In testimony whereof we hereunto affix our signatures in the presence of two witnesses.

WILLIAM FETZER.
JOHN G. FRERES.
OTTO A. ELLIOTT.

Witnesses:
M. M. DOUGLAS,
E. THOMPSON.